(12) United States Patent
Shioji et al.

(10) Patent No.: US 9,702,112 B2
(45) Date of Patent: Jul. 11, 2017

(54) HYDRAULIC EXCAVATOR

(71) Applicant: KOMATSU LTD., Minato-ku, Tokyo (JP)

(72) Inventors: Hiroyuki Shioji, Hirakata (JP); Yoshiaki Honma, Hirakata (JP); Daisuke Tsukamoto, Hirakata (JP); Hiroaki Tanaka, Hirakata (JP)

(73) Assignee: KOMATSU LTD., Tokyo (JP)

( * ) Notice: Subject to any disclaimer, the term of this patent is extended or adjusted under 35 U.S.C. 154(b) by 492 days.

(21) Appl. No.: 14/128,261

(22) PCT Filed: Jul. 16, 2013

(86) PCT No.: PCT/JP2013/069248
§ 371 (c)(1),
(2) Date: Dec. 20, 2013

(87) PCT Pub. No.: WO2014/112140
PCT Pub. Date: Jul. 24, 2014

(65) Prior Publication Data
US 2016/0186410 A1    Jun. 30, 2016

(30) Foreign Application Priority Data

Jan. 18, 2013    (JP) .................................. 2013-007239

(51) Int. Cl.
*E02F 9/08*    (2006.01)
*B60R 11/02*    (2006.01)
(Continued)

(52) U.S. Cl.
CPC ........ *E02F 9/0858* (2013.01); *B60R 11/0235* (2013.01); *B62D 33/06* (2013.01);
(Continued)

(58) Field of Classification Search
CPC .... B60J 5/02; B60R 11/0229; B60R 11/0235; B62D 24/04; B62D 33/06; E02F 9/0858;
(Continued)

(56) References Cited

U.S. PATENT DOCUMENTS 5,519,141 A        5/1996    Nita et al.
6,474,705 B1 *    11/2002   Mori ..................... E02F 9/163
                                                                    292/216
(Continued)

FOREIGN PATENT DOCUMENTS

CN    201033877 Y    3/2008
CN    100516387 C    7/2009
(Continued)

OTHER PUBLICATIONS

English translation of DE 20 2009 002 114; retreived from Patent-Translate on May 3, 2016, located at www.epo.org.*

*Primary Examiner* — Jason S Daniels
(74) *Attorney, Agent, or Firm* — Drinker Biddle & Reath LLP (57) ABSTRACT

A hydraulic excavator includes a cab and a work implement arranged on one lateral side of the cab. The cab includes an operator's seat, front pillars, a roof portion, first and second guide rails, a front window, a monitor device, a monitor, and a support member. The monitor is supported on a first pillar above the monitor device and has a second display screen larger than a first display screen. The support member supports the monitor so as to be movable between an interference position interfering with a movement region where the front window moves between a closed state and an opened state of an opening, and a non-interference position with no interference. Accordingly, a hydraulic excavator can be obtained in which a large-sized monitor can be arranged on a front side of the cab without interference with a movable front window.

6 Claims, 7 Drawing Sheets (51) Int. Cl.
  *B62D 33/06* (2006.01)
  *E02F 9/16* (2006.01)
  *E02F 9/26* (2006.01)
  *E02F 9/22* (2006.01)
  *E02F 3/32* (2006.01)

(52) U.S. Cl.
  CPC .................. *E02F 3/32* (2013.01); *E02F 9/16* (2013.01); *E02F 9/2203* (2013.01); *E02F 9/2292* (2013.01); *E02F 9/26* (2013.01)

(58) Field of Classification Search
  CPC ... E02F 9/16; E02F 9/2203; E02F 9/26; E02F 9/261
  USPC .............. 296/190.01, 190.04, 190.1, 190.11, 296/193.06
  See application file for complete search history.

(56) References Cited

U.S. PATENT DOCUMENTS

| | | |
|---|---|---|
| 8,087,623 B2 | 1/2012 | Suddarth |
| 8,172,312 B2 | 5/2012 | Hobenshield et al. |
| 2003/0025338 A1 | 2/2003 | Mori et al. |
| 2005/0150142 A1 | 7/2005 | Matsuda et al. |
| 2005/0151845 A1* | 7/2005 | Tsukada .................... E02F 9/26 348/148 |
| 2005/0277322 A1 | 12/2005 | Postrel |
| 2011/0068241 A1 | 3/2011 | Suddarth |

FOREIGN PATENT DOCUMENTS

| | | | |
|---|---|---|---|
| CN | 102561440 A | 7/2012 | |
| DE | 60029267 T2 | 6/2007 | |
| DE | 202009002114 U1 * | 7/2010 | ............ B60R 11/02 |
| JP | H07-033755 A | 2/1995 | |
| JP | H08-270018 A | 10/1996 | |
| JP | H11-324020 A | 11/1999 | |
| JP | 2000-291323 A | 10/2000 | |
| JP | 2000-355958 A | 12/2000 | |
| JP | 2002-327571 A | 11/2002 | |
| JP | 2005-163470 A | 6/2005 | |
| JP | 2006-016915 A | 1/2006 | |
| JP | 2006-342583 A | 12/2006 | |
| JP | 2010-105568 A | 5/2010 | |
| JP | 2012-136873 A | 7/2012 | |
| KR | 0147415 B1 | 5/1998 | |
| KR | 10-2005-0020613 A | 3/2005 | |
| KR | 10-2005-0053329 A | 6/2005 | |

* cited by examiner

HYDRAULIC EXCAVATOR

TECHNICAL FIELD

The present invention relates to a hydraulic excavator, and more particularly to a hydraulic excavator employing an information-oriented construction system.

BACKGROUND ART

In recent years, introduction of information-oriented construction to a work vehicle is rapidly promoted. The information-oriented construction is a system for the purpose of achieving construction with high efficiency and high accuracy in a construction stage of a construction project by conducting position detection for a work implement with use of an information and communication technology (ICT) and automatically controlling the work implement based on the detected position of the work implement. A conventional work vehicle employing the information-oriented construction system is disclosed for instance in PTD 1 (Japanese Patent Laying-Open No. 2005-163470).

CITATION LIST

Patent Document

PTD 1: Japanese Patent Laying-Open No. 2005-163470

SUMMARY OF INVENTION

Technical Problem

Since the amount of information to be displayed on a monitor for the information-oriented construction is large, a monitor conventionally provided in a cab cannot display information sufficiently. Therefore, enlargement of a monitor is required. Further, the monitor for the information-oriented construction is arranged at a location where the monitor can be seen readily during operation, for example, on the front side in the cab. On the other hand, it is required that a front window on the front side of the cab is provided openably and closably so that an operator can visually recognize the work implement. If the monitor is simply enlarged, there may be a case where the front window cannot be opened due to interference between the monitor and the front window when opening the front window.

The present invention was made in view of the problem described above, and its object is to provide a hydraulic excavator in which a monitor with a large-sized screen can be arranged on the front side of the cab without interference with a movable front window.

Solution to Problem

A hydraulic excavator of the present invention is a hydraulic excavator including a cab and a work implement arranged on one lateral side of the cab. The cab includes an operator's seat, front pillars, a roof portion, a first guide rail, a second guide rail, a front window, a first monitor, a second monitor, and a support member. The front pillars are arranged in front of the operator's seat. The front pillars have a first pillar arranged on one lateral side and a second pillar arranged on the other lateral side. The roof portion covers above the operator's seat. The first guide rail extends along the first and second pillars respectively. The second guide rail extends along the roof portion. The front window has an upper end portion and a lower end portion. The upper end portion is movable along the second guide rail, and the lower end portion is movable along the first guide rail. The first monitor is arranged on a side of the first pillar in front of the operator's seat, and has a first display screen. The second monitor is supported on the first pillar above the first monitor and has a second display screen larger than the first display screen. The support member has a base portion fixed to the first pillar, a rotating unit supported on the base portion rotatably, and a universal joint supporting the second monitor on the rotating unit. The support member supports the second monitor so as to be movable to an interference position interfering with a moving region where the front window moves between a closed state and an opened state of an opening formed between the first and second pillars, and a non-interference position with no interference.

According to the hydraulic excavator of the present invention, the second monitor having the second display screen larger than the first display screen is provided. Therefore, information for the information-oriented construction can be displayed sufficiently. Further, when moving the front window, interference between the second monitor having a large display screen and the front window can be avoided by moving the second monitor to the non-interference position. Further, among the front pillars arranged on the front side in the cab, the second monitor can be mounted through the support member to the first pillar provided on a side close to the work implement. Therefore, a vision shift amount of an operator during operation of the work implement can be made small, so that the work efficiency can be improved. Further, by rotating the second monitor relative to the support member to allow rotation of the support member relative to the first pillar, the second monitor can be moved relative to the first pillar. Thus, the second monitor can be moved readily from the interference position to the non-interference position.

In the hydraulic excavator described above, the second display screen has an upper edge and a lower edge. When the second monitor is at the interference position, the upper edge is arranged more on the front side than the lower edge. When the second monitor is at the non-interference position, the lower edge is arranged more on the front side than the upper edge.

Accordingly, visibility of the second display screen can be improved when an operator is seated on the operator's seat, so that the operator can see the second display screen more readily.

In the hydraulic excavator described above, when the second monitor is at the non-interference position, the second display screen is oriented toward the lateral side of the cab more than the state where the second monitor is at the interference position.

In such a manner, the second monitor can be moved from the interference position to the non-interference position by moving the second monitor so as to allow the second display screen to be oriented toward the lateral side of the cab.

In the hydraulic excavator described above, the cab further includes a control lever. The control lever at a neutral position is arranged to avoid interference with the most rear part of the second monitor. The control lever is arranged to avoid interference with the most rear part of the second monitor as long as it is at a neutral position regardless of the position of the control lever in the forward and backward directions.

Accordingly, interference between the second monitor and the control lever can be avoided reliably when the second monitor is moved to the non-interference position to avoid interference between the front window and the second monitor.

Advantageous Effects of Invention

As described above, according to the present invention, a second monitor with a large-sized screen can be arranged on a front side in a cab without interference with a front window movable between a closed position and an opened position.

DESCRIPTION OF EMBODIMENTS

Hereinafter, embodiments of the present invention will be described with reference to the drawings.

First Embodiment

Firstly, a configuration of a hydraulic excavator to which the idea of the present invention is applicable will be described.

Figure 1:
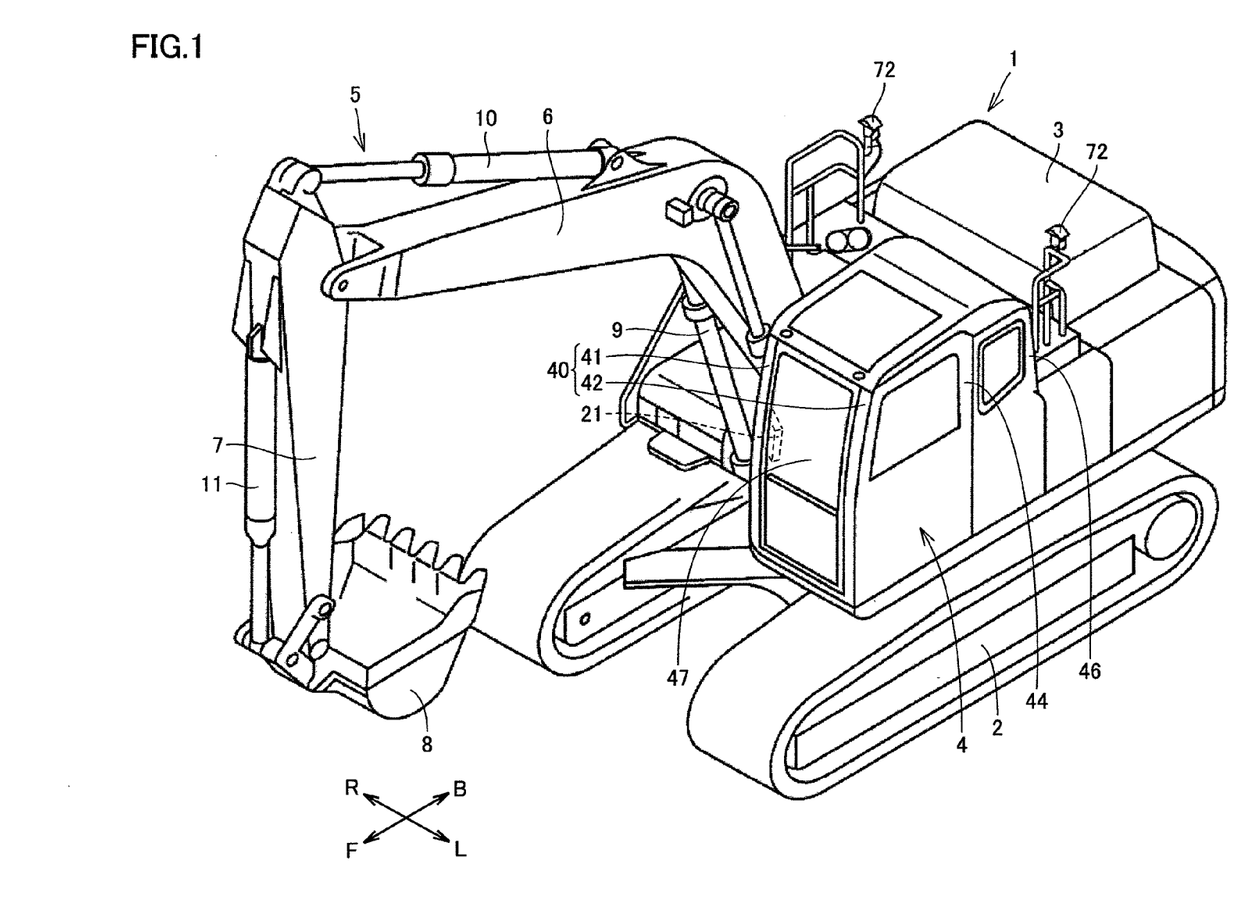
FIG. 1 is a perspective view schematically representing a configuration of a hydraulic excavator according to one embodiment of the present invention.

Referring to FIG. 1, a hydraulic excavator 1 mainly includes a lower traveling unit 2, an upper revolving unit 3, and a work implement 5. Lower traveling unit 2 and upper revolving unit 3 constitute a work vehicle main body.

Lower traveling unit 2 has a pair of left and right crawler belts. It is configured to allow hydraulic excavator 1 to be self-propelled by rotation of the pair of crawler belts. Upper revolving unit 3 is revolvably mounted on lower traveling unit 2.

Upper revolving unit 3 includes a cab 4, which is a compartment for an operator to operate hydraulic excavator 1, at a left side L on a front side F (vehicle front side). Cab 4 is included in the work vehicle main body. Upper revolving unit 3 includes an engine compartment for accommodating an engine and a counter weight on a rear side B (vehicle rear side). In the present embodiment, when an operator is seated in cab 4, the leftward direction from the operator will be referred to as left side L, the rightward direction as a right side R, the forward direction as front side F, and the backward direction as a rear side B.

Work implement 5 for performing operation such as earth excavation is pivotally supported by upper revolving unit 3 so as to be swingable in the upward and downward directions. Work implement 5 has a boom 6 mounted swingably in the upward and downward directions at a substantially central portion on front side F of upper revolving unit 3, an arm 7 mounted swingably in the forward and backward directions at a leading end portion of boom 6, and a bucket 8 mounted swingably in the forward and backward directions at a leading end portion of arm 7. Boom 6, arm 7, and bucket 8 are configured to be swingably driven respectively by a boom cylinder 9, an arm cylinder 10, and a bucket cylinder 11, which are hydraulic cylinders.

Work implement 5 is provided on right side R relative to cab 4. Work implement 5 is provided on right side R as one lateral side of cab 4 relative to cab 4 arranged at left side L on front side F of upper revolving unit 3. It should be noted that arrangement of cab 4 and work implement 5 is not limited to the example shown in FIG. 1. For example, work implement 5 may be provided on the left side of cab 4 arranged on the front right side of upper revolving unit 3.

Figure 2:
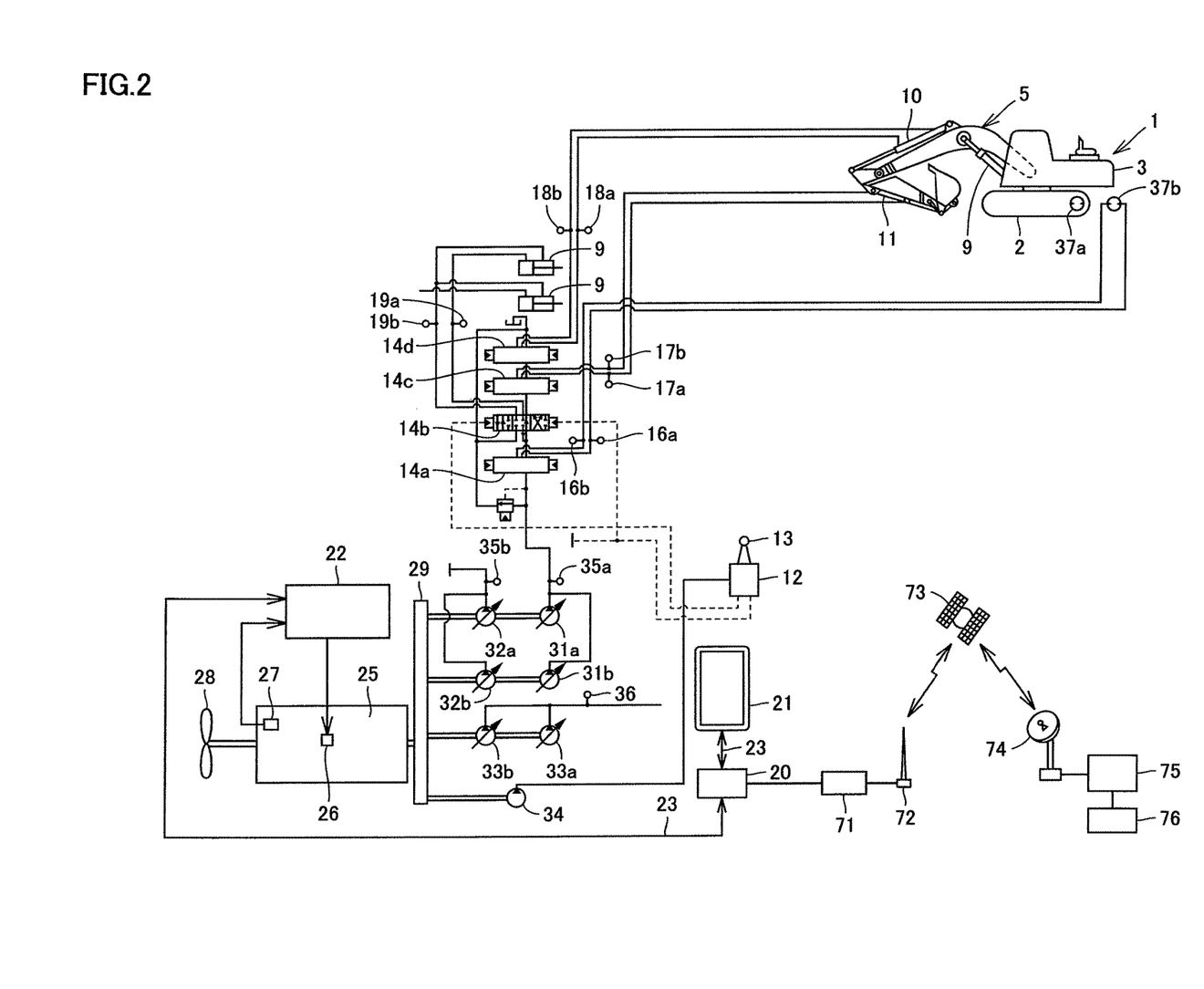
FIG. 2 is a hydraulic circuit diagram applied to the hydraulic excavator shown in FIG. 1.

Referring to FIG. 2, a PTO (abbreviation of Power Take Off) device 29 of an engine 25 mounted on rear side B of upper revolving unit 3 is coupled with a plurality of hydraulic pumps 31a, 31b, 32a, 32b, 33a, 33b, 34. Hydraulic pump 34 supplies a pilot pressure to a pilot pressure operation valve 12 operated with control lever 13. Other hydraulic pumps 31a-33b supply pressurized oil to each of hydraulic cylinders 9, 10, and 11 for actuating work implement 5, a revolving motor for revolvably driving upper revolving unit 3, left and right travel motors 37a, 37b provided in lower traveling unit 2, and the like. The hydraulic circuit for driving the actuator not illustrated in FIG. 2 is configured by a circuit similar to the circuit illustrated in FIG. 2.

The pressurized oil discharged from hydraulic pumps 31a, 31b is supplied to right travel motor 37b, boom cylinder 9, bucket cylinder 11, and arm cylinder 10 respectively through a right travel motor switching valve 14a, a boom switching valve 14b, a bucket switching valve 14c, and an arm switching valve 14d. Pilot operation portions of these switching valves 14a-14d receive supply of corresponding pilot pressure from pilot pressure operation valve 12.

Discharge tube passages of hydraulic pumps 31a, 31b, discharge tube passages of hydraulic pumps 32a, 32b, and discharge tube passages of hydraulic pumps 33a, 33b are provided with pressure sensors 35a, 35b, 36 for detecting respective pump discharge pressure. The tube passages connecting switching valves 14a-14d and each actuator are provided with pressure sensors 16a, 16b, 17a, 17b, 18a, 18b, 19a, 19b for detecting a load pressure of each actuator, respectively. Also with regard to the revolving motor and left travel motor 37a, connection passages thereof are similarly provided with pressure sensors (not illustrated) for detecting respective load pressures. Detection signals of these pressure sensors are inputted to controller 20. Controller 20 calculates load frequencies (occurrence frequency for each load level, and corresponding to a load amount) for the work implement and the travel driver of lower traveling unit 2 respectively based on load pressure detection values of actuators from the pressure sensors.

Fuel injection pump 26 of engine 25 receives input of a fuel injection amount instruction from engine controller 22. Engine controller 22 receives input of a detection signal of an engine rotation speed sensor 27 provided on an output rotating shaft of engine 25 as a feedback signal. Engine controller 22 calculates fuel injection amount instruction so as to drive engine 25 with a predetermined horse power based on the feedback signal of the engine rotation speed and outputs the same, and inputs the engine rotation speed and the outputted fuel injection amount instruction to controller 20.

Controller 20, engine controller 22, and monitor 21 are connected through a bidirectional communication cable 23 to form a communication network in hydraulic excavator 1. Monitor 21, controller 20, and engine controller 22 are capable of transmitting information with each other via network communication cables 23, 23. It should be noted that monitor 21, controller 20, and engine controller 22 are respectively configured to have computer devices such as microcomputers as main bodies.

Information can be transmitted between controller 20 and an outside monitoring station 76. In the present embodiment, controller 20 and monitoring station 76 communicate with each other through a satellite communication. Controller 20 is connected with a communication terminal 71 having a satellite communication antenna 72. As shown in FIG. 1, satellite communication antenna 72 is mounted to upper revolving unit 3. Monitoring station 76 on the earth is connected via the internet with a network control station 75, which is coupled via a dedicated line with a communication earth station 74 communicating with communication satellite 73 via a dedicated communication line. Accordingly, data is transmitted between controller 20 and predetermined monitoring station 76 via communication terminal 71, communication satellite 73, communication earth station 74, and network control station 75.

An example of mounting the information-oriented construction system to hydraulic excavator 1 of the present embodiment will be described. The construction design data created by three-dimensional CAD (Computer Aided Design) is stored in advance in controller 20. Monitor 21 displays real-time updates of current position of hydraulic excavator 1 on a screen, so that an operator can always confirm the working condition of hydraulic excavator 1.

Controller 20 compares construction design data with a position and a posture of work implement 5 in real-time manner, and drives the hydraulic circuit based on the result of comparison to control work implement 5. More specifically, a position at which construction should be conducted in accordance with the construction design data and a position of bucket 8 are matched to perform construction such as excavation, ground leveling, or the like thereafter. Accordingly, since work implement 5 of hydraulic excavator 1 is automatically controlled based on the construction design data, there is no need to provide a stake as a mark during construction, so that construction efficiency is improved. Additionally, construction accuracy can be improved, so that high-quality construction practice can be readily performed.

Referring back to FIGS. 1 and 3, an operator's seat 61 to be seated by an operator oriented toward front side F is arranged inside cab 4. Cab 4 includes a roof portion arranged to cover operator's seat 61, and a plurality of pillars supporting the roof portion. The plurality of pillars have front pillars 40 arranged on front side F relative to operator's seat 61, rear pillars 46 arranged on rear side B relative to operator's seat 61, and an intermediate pillar 44 arranged between front pillars 40 and rear pillars 46. Each pillar extends in the vertical direction orthogonal to a horizontal plane, and is coupled to a floor portion and a roof portion of cab 4.

Figure 3:
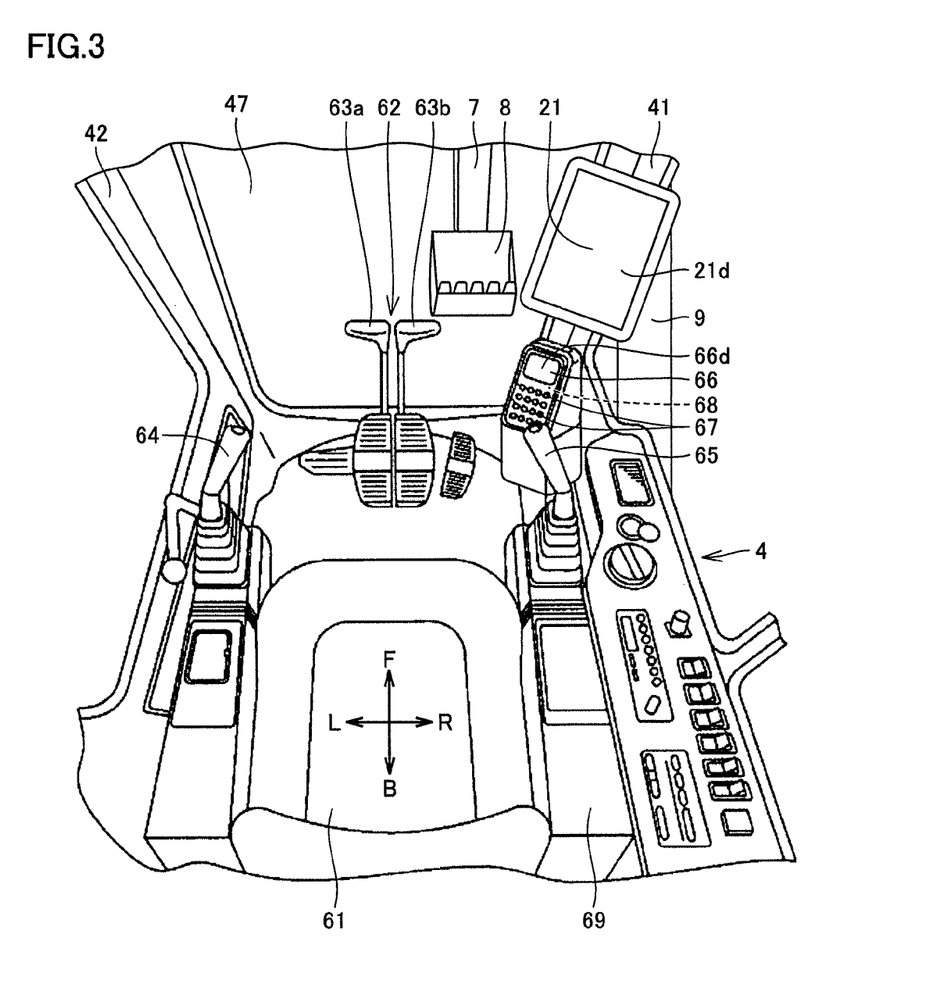
FIG. 3 is a perspective view representing an interior of a cab of the hydraulic excavator.

Front pillar 40 has a first pillar 41 and a second pillar 42. Work implement 5 is arranged on right side R relative to cab 4, and first pillar 41 is arranged on right side R (one lateral side) which is a side close to work implement 5. Second pillar 42 is arranged on left side L (the other lateral side) which is away from work implement 5. A space surrounded by first pillar 41, second pillar 42, and a pair of rear pillars 46 forms a room space of cab 4. Operator's seat 61 is accommodated in the room space of cab 4, and is arranged at a substantially central portion of the floor portion of cab 4. At a lateral face on left side L of cab 4, a door for allowing an operator to board and exit cab 4 is provided.

A front window 47 is arranged between first pillar 41 and second pillar 42. Front window 47 is arranged on front side F relative to operator's seat 61. Front window 47 is formed of transparent material so that an operator seated on operator's seat 61 can visually recognize outside of cab 4 through front window 47. For example, as shown in FIG. 3, the operator seated on operator's seat 61 can directly see bucket 8 excavating the earth through front window 47.

Referring to FIG. 3, a monitor device 66 is provided on front side F in cab 4. Monitor device 66 is arranged at the corner portion on the right front side in cab 4 and supported by a supporting stand extending from the floor portion of cab 4. Monitor device 66 is arranged on the side of operator's seat 61 relative to first pillar 41. Monitor device 66 is arranged on the near side of first pillar 41 when viewed from the operator seated on operator's seat 61.

Since monitor device 66 is used for various purposes, it includes a planar display screen 66d having various monitor functions, a switch portion 67 having a plurality of switches with various functions allotted, and a voice generator 68 vocally presenting the contents displayed on display screen 66d. This display screen 66d is configured by a graphic display such as a liquid crystal display, a plasma display, or the like. Switch portion 67 is constituted by a plurality of key switches, but not limited to it. It may be constituted by touch switches of a touch-panel type.

On front side F of operator's seat 61, there are provided left and right travel control levers 63a, 63b as a traveling operation unit 62 for operating lower traveling unit 2. On left side L and right side R of operator's seat 61, there are provided work implement control levers 64, 65 for operating actuation of work implement 5 (boom 6, arm 7, and bucket 8) and revolving of upper revolving unit 3, respectively. Left and right travel control levers 63a, 63b and work implement control levers 64, 65 correspond to control lever 13 shown in FIG. 2. These control levers are connected with respective pilot pressure operation valves 12 (refer to FIG. 2) for operating actuation of hydraulic cylinders 9, 10, 11 for work implement 5, a revolving motor, and left and right travel motors 37a, 37b. On right side R of operator's seat 61, there is also provided a console 69 for operating work implement 5.

Above monitor device 66, there is arranged monitor 21 described with reference to FIG. 2 for displaying a current position of hydraulic excavator 1 received from outside. Monitor 21 has a planar display screen 21d. Comparing display screen 66d of monitor device 66 with display screen 21d of monitor 21 shown in FIG. 3, display screen 21d is provided so as to be larger than display screen 66d. For example, monitor device 66 may have display screen 66d of 7 inches, and monitor 21 may have display screen 21d of 12 inches.

Among the pair of front pillars 40, monitor 21 is attached to first pillar 41 on right side R close to work implement 5 and arranged on rear side B of first pillar 41. Monitor 21 is arranged on the near side of first pillar 41 in the line of sight toward the right front side of the operator seated on operator's seat 61. In hydraulic excavator 1 including work implement 5 on right side R of cab 4, attaching monitor 21 to first pillar 41 allows the operator to see both work implement 5 and monitor 21 with a small vision shift amount.

Figure 4:
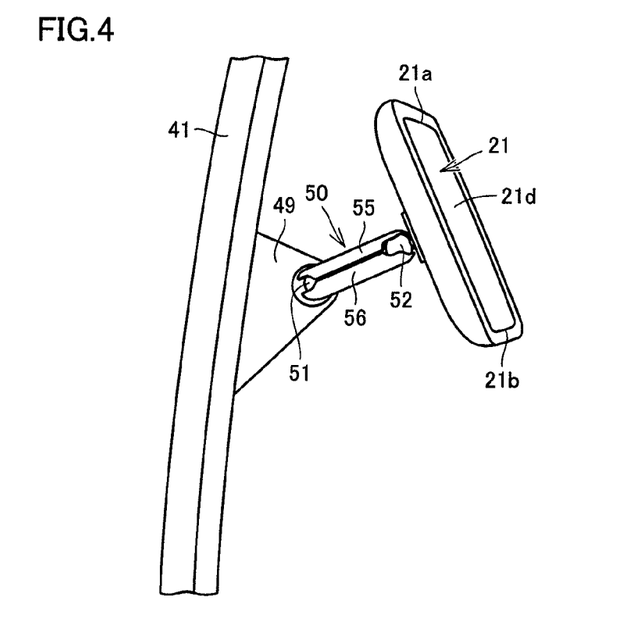
FIG. 4 is a perspective view schematically representing a configuration of a support member supporting a monitor.
Figure 5:
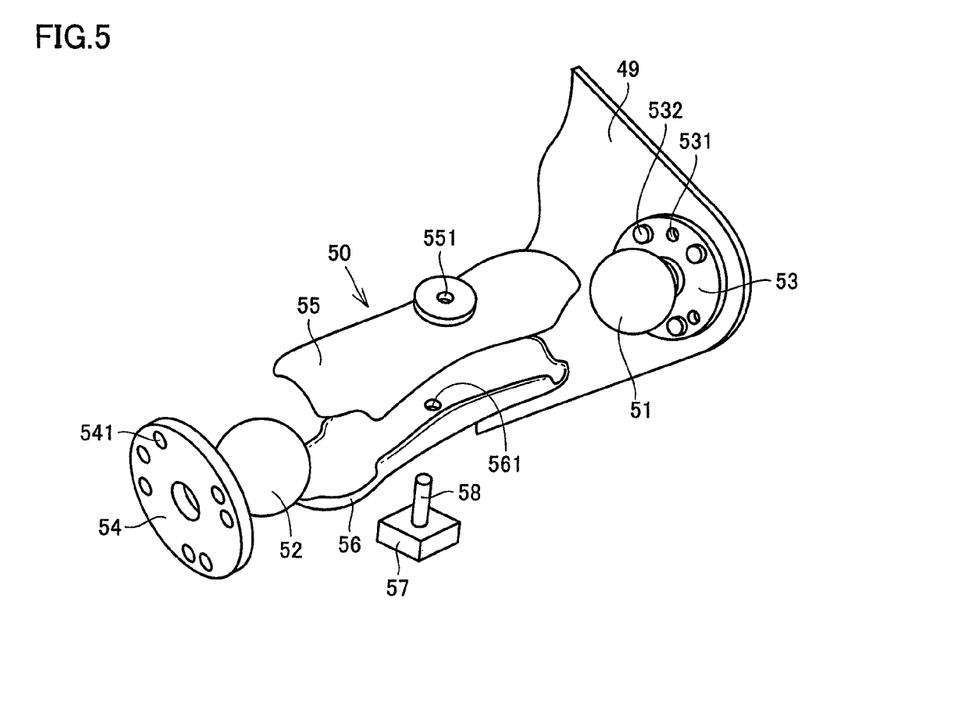
FIG. 5 is an exploded perspective view representing the support member shown in FIG. 4.

Monitor 21 is attached to first pillar 41 through a support member 50. Referring to FIGS. 4 and 5, a plate-like fin portion 49 is fixed on rear side B relative to first pillar 41. Fin portion 49 is provided so as to be not movable relative to first pillar 41. Fin portion 49 is arranged so as to extend in the forward and backward directions of cab 4 and has an inner surface oriented toward left side L and an outer surface oriented toward right side R. Support member 50 is attached to the inner side surface of fin portion 49.

Support member 50 includes a base member attached to an inner side surface of fin portion 49, a joint member 52 attached to a back side of monitor 21, and arm members 55, 56 provided between base member 51 and joint member 52.

Base member 51 has a spherical sphere portion and a disk-like plate portion 53. Plate portion 53 has a plurality of through holes 531 formed to penetrate through plate portion 53 in the thickness direction. Joining members 532 are provided to penetrate through through holes 531, so that plate portion 53 is joined to fin portion 49. Base member 51 is fixed to first pillar 41 through fin portion 49. Fin portion 49 and base member 51 serve as a base portion fixed to first pillar 41.

Joint member 52 has a spherical sphere portion and a disk-like plate portion 54. Plate portion 54 has a plurality of though holes 541 formed to penetrate through plate portion 54 in the thickness direction. Joining members are provided to penetrate through through holes 541, so that plate portion 54 is joined to monitor 21. Joint member 52 serves as a supporting portion attached to monitor 21.

Arm members 55, 56 are arranged to sandwich the spherical portion of base member 51 on one end and the spherical portion of joint member 52 on the other end. Arm members 55, 56 serve as a rotating unit. Joint member 52 serves as a universal joint. Arm member 55 has a threaded hole 551, and arm member 56 has a through hole 561. The pair of arm members 55, 56 are joined together by a bolt member 58 penetrating through through hole 561 and screwed to threaded hole 551. Bolt member 58 has a tab portion 57 on one end. An operator holds tab portion 57 and rotates the same to join and dismantle arm members 55, 56 with use of bolt member 58.

Arm members 55, 56 are joined to fin portion 49 through the spherical portions of base member 51, so that arm members 55, 56 are provided to be movable relative to fin portion 49 by freely changing an angle relative to the inner surface of fin portion 49. Accordingly, support member 50 is provided to be pivotable relative to first pillar 41 having fin portion 49 attached thereto.

Monitor 21 is joined to arm members 55, 56 though the spherical portion of joint member 52, so that monitor 21 is provided to be movable relative to arm members 55, 56 by freely changing an angle relative to the extending direction of arm members 55, 56. Accordingly, monitor 21 is provided so as to be pivotable with respect to support member 50.

By firmly tightening arm members 55, 56, the spherical portion of base member 51 is firmly sandwiched by arm members 55, 56, and the spherical portion of joint member 52 is firmly sandwiched by arm members 55, 56. Tightening by arm members 55, 56 holds monitor 21 so as to be not movable with respect to first pillar 41, so that monitor 21 can be positioned with respect to first pillar 41.

By loosening tightened arm members 55, 56, support member 50 can be moved relative to fin portion 49, so that monitor 21 can be moved relative to support member 50. Accordingly, monitor 21 can be moved freely relative to first pillar 41 within a movable range determined by support member 50.

Figure 6:
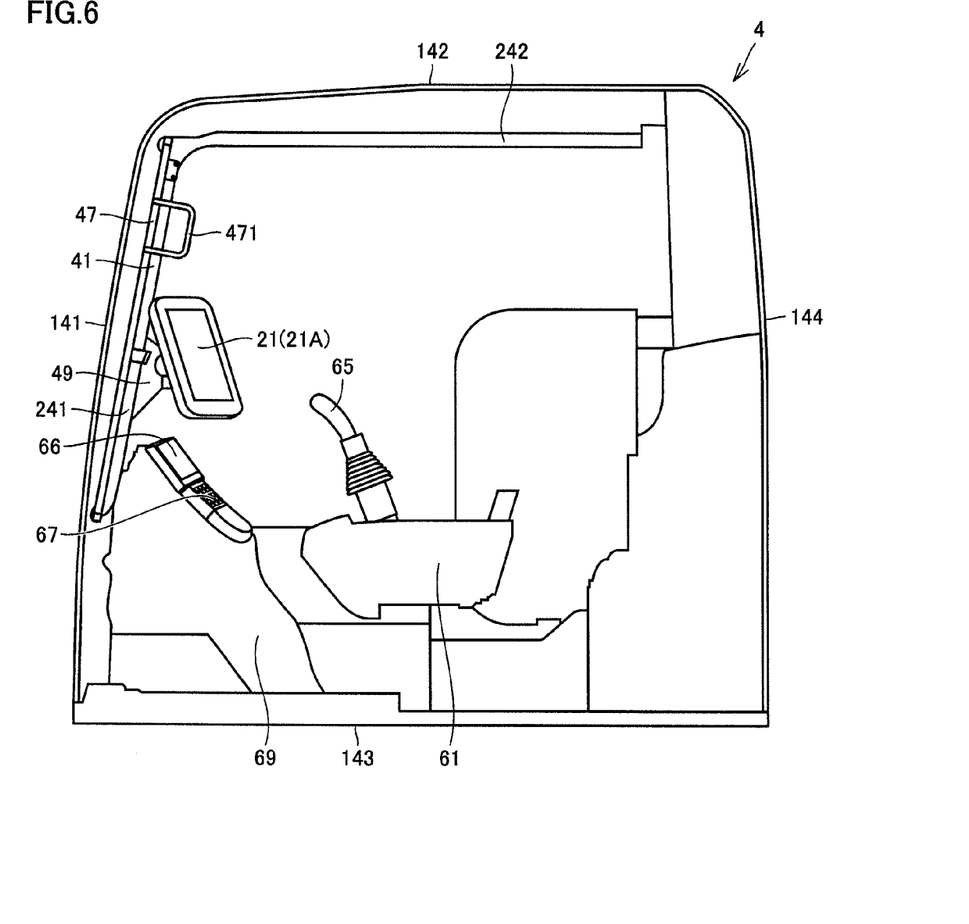
FIG. 6 schematically represents a cross section of the cab in the state where the monitor is arranged at the interference position.
Figure 7:
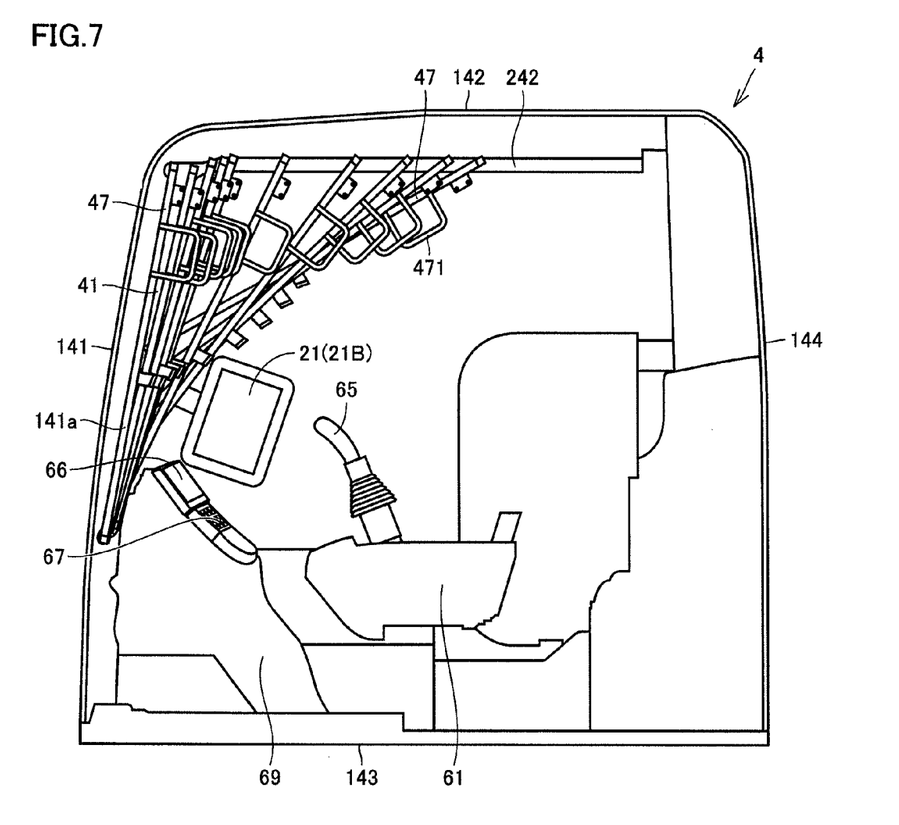
FIG. 7 schematically represents a cross section of the cab in the state where the monitor is arranged at the non-interference position.

Hereinafter, movement of monitor 21 inside cab 4 will be described in detail. Referring to FIGS. 6 and 7, cab 4 has a front wall 141 on front side F relative to operator's seat 61, a rear wall 144 on rear side B, a roof portion 142 covering operator's seat 61, and a floor portion 143 supporting operator's seat 61 from a lower side. Operator's seat 61 is arranged at a substantially central portion in the room space of cab 4. Monitor device 66 is supported by a support stand 69 extending from floor portion 143. Monitor 21 is attached to first pillar 41 through fin portion 49 and arranged above monitor device 66.

In cab 4, a first guide rail 241 extending along front wall 141 and a second guide rail 242 extending along roof portion 142 are arranged. First guide rail 241 extends along first and second pillars 41, 42 respectively. Front window 47 is supported movably by first and second guide rails 241, 242. Front wall 141 has an opening 141a shown in FIG. 7, and front window 47 is provided so as to be movable to a close position of closing said opening 141a and an open position of opening said opening 141a. Front window 47 is provided to be freely openable and closable. Front window 47 arranged at the closed position is supported by first guide rail 241, and closes opening 141a on front side F of cab 4. Front window 47 moves upward to roof portion 142 of cab 4 from the close position, and then is arranged at the open position of opening said opening 141a. Front window 47 arranged at the open position is supported by both first and second guide rails 241, 242.

FIG. 6 shows arrangement of monitor 21 in the case where front window 47 is at the close position. Monitor 21 is arranged with display screen 21d oriented toward the side of operator's seat 61 so that the operator seated on operator's seat 61 can visually recognize display screen 21d in an easy manner.

FIG. 7 illustrates a movement region of front window 47 moving between the close position and the open position. A grip 471 is attached to the surface of front window 47 on the side of the room space of cab 4. Front window 47 is provided so as to be manually movable by an operator gripping grip 471 and lifting front window 47. Front window 7 has an upper end portion and a lower end portion, and is provided so that the upper end portion is movable along roof portion 142, and the lower end portion is movable along first and second pillars 41, 42.

Comparing FIGS. 6 and 7, if monitor 21 is kept arranged at the position shown in FIG. 6, monitor 21 interferes with the movement region of front window 47. The position of monitor 21 shown in FIG. 6 will be referred to as an interference position. If monitor 21 is at the interference position, movement of front window 47 is blocked, so that it becomes difficult for the operator to open front window 47 to directly see outside of cab 4. Therefore, monitor 21 of the present embodiment is provided so as to be movable to a position of avoiding interference with the movement region of front window 47. By moving monitor 21 from the interference position shown in FIG. 6 to the position shown in FIG. 7, monitor 21 does not overlap with the movement region of front window 47, so that monitor 21 does not interfere front window 47. The position of monitor 21 shown in FIG. 7 will be referred to as a non-interference position.

Figure 8:
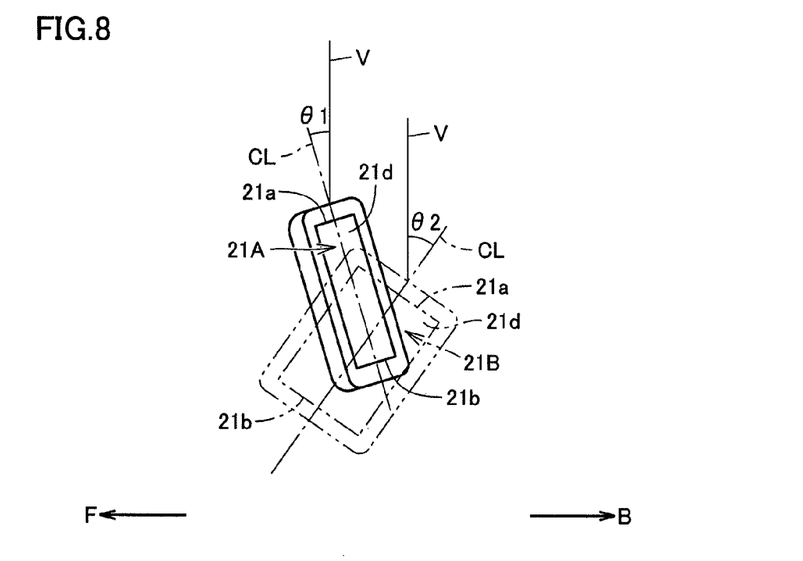
FIG. 8 schematically represents a side view of the monitor at the interference position and the non-interference position.

Referring to FIGS. 6-8, comparing monitor 21 arranged at the interference position (monitor 21A) with monitor 21 arranged at the non-interference position (monitor 21B), monitor 21B is arranged at a position moved toward rear side B in cab 4 relative to monitor 21A.

In FIG. 8, monitor 21A at the interference position shown in FIG. 6 is illustrated with a solid line, and monitor 21B at the non-interference position shown in FIG. 7 is illustrated with a two-dot chain line. Further, in FIG. 8, a straight line passing through a center of an upper edge 21a and a center of a lower edge 21b of rectangular-shaped display screen 21d of monitor 21 is illustrated with a one-dot chain line as a center line CL. Further, in FIG. 8, a vertical direction V orthogonal to a horizontal plane is illustrated. A tilt angle at which center line CL of monitor 21A at the interference position is tilted relative to vertical direction V is referred to as a first tilt angle θ1. A tilt angle at which center line CL of monitor 21B arranged at the non-interference position is referred to as a second tilt angle θ2. In this instance, first tilt angle θ1 is smaller than second tilt angle θ2. In other words, a tilt angle of monitor 21B relative to vertical direction V is greater than that of monitor 21A.

As to monitor 21A at the interference position, upper edge 21a of display screen 21d is arranged more on front side F than lower edge 21b of display screen 21d. On the other hand, as to monitor 21B at the non-interference position, upper edge 21a of display screen 21d is arranged more on rear side B than lower edge 21b of display screen 21d. FIGS. 6 and 7 illustrate a cross section of cab 4 along the forward and backward directions. As shown in FIGS. 7 and 8, monitor 21B is oriented toward the lateral side cab 4 more than monitor 21A.

Console 69 shown in FIG. 3 is arranged on right side R of operator's seat 61. On the upper surface front side of console 69, a work implement control lever 65 for actuating work implement 5 is provided. On the center and rear sides of the upper surface of console 69, an arm rest is provided. Console 69 is configured so that a height and front/rear positions can be adjusted to readily operate levers, switches, and the like in accordance with a body shape of the operator seated on operator's seat 61. Work implement control lever 65 is configured to be movable in forward/backward and leftward/rightward directions. Boom 6 of work implement 5 is lowered when work implement control lever 65 is moved forward, and is raised when work implement control lever 65 is moved backward. The bucket of work implement 5 is operated by leftward and rightward movement of work implement control lever 65. In the state of not being operated, work implement control lever 65 is positioned at a neutral position at the center of forward/backward and leftward/rightward movement. At this neutral position, the work implement stops its operation.

Work implement control lever 65 shown in FIGS. 6 and 7 is provided so as to be movable in the forward and backward directions by movement of console 69. FIGS. 6 and 7 represent the state where work implement control lever 65 is moved to most front side F and positioned at the neutral position in the forward and backward directions. As shown in FIG. 6, monitor 21A at the interference position is arranged so as not to interfere with work implement control lever 65 in the state described above. As shown in FIG. 7, monitor 21B at the non-interference position is arranged so as not to interfere with work implement control lever 65 in the state described above. Work implement control lever 65, if it were at a neutral position, is arranged to avoid interference with monitor 21 whether it moves from the interference position to the non-interference position, regardless of the forward and backward position of console 69, in other words, work implement control lever 65.

Next, effect of the present embodiment will be described.

According to the present embodiment, in addition to monitor device 66 as a first monitor conventionally provided in cab 4 of hydraulic excavator 1, monitor 21 as a second monitor is provided in cab 4. Monitor 21 is a monitor for displaying real-time updates of a current position of hydraulic excavator 1 for the information-oriented construction, and the amount of information which should be displayed on display screen 21d is large. Therefore, information for the information-oriented construction can be displayed sufficiently. By providing display screen 21d of monitor 21 having a larger screen as compared to display screen 66d of monitor device 66, an operator can readily confirm information to be displayed on display screen 21d.

Monitor 21 is supported by support member 50 so as to be movable to the interference position interfering with the movement region of front window 47 and the non-interference position of not interfering with the movement region of front window 47. In the state where front window 47 is closed, monitor 21 can be arranged at the interference position so that an operator can readily confirm display screen 21d of monitor 21. On the other hand, when opening front window 47, if monitor 21 is moved to the non-interference position, moving front window 47 does not interfere with monitor 21, so that movement of front window 47 is not blocked by monitor 21. Thus, a large-sized monitor 21 can be arranged on front side F of the internal space of cab 4 without interference with movable front window 47.

Monitor 21 is attached to front pillar 40 on front side F relative the operator seated on operator's seat 61. Particularly, monitor 21 is attached to the side on which work implement 5 is arranged relative to cab 4, in other words, to first pillar 41 arranged on right side R. Since monitor 21 is arranged at a position overlapping with first pillar 41 from a view of an operator, a large-sized monitor 21 can be arranged in cab 4 without narrowing a sight of an operator during the construction. Since the operator can see both work implement 5 and monitor 21 with a small vision shift amount in the state of being seated on operator's seat 61, confirmation of work becomes easier. Arranging support member 50 supporting monitor 21 at a position hidden behind monitor 21 from a view of the operator can preserve a wider sight of an operator.

Further, support member 50 is provided rotatably with respect to first pillar 41, and monitor 21 is provided rotatably with respect to support member 50. Accordingly, support member 50 is rotated relative to first pillar 41 while rotating monitor 21 with respect to support member 50, so that monitor 21 can be moved relative to first pillar 41. Therefore, a degree of freedom in arranging monitor 21 with respect to first pillar 41 is improved. Thus, monitor 21 can be moved more readily from the interference position to the non-interference position.

Arm members 55, 56 of support member 50 are configured to be engaged and dismantled by the operator rotating tab portion 57. Therefore, without need to use a tool, a position of monitor 21 can be adjusted by rotating tab portion 57 to loosen bolt member 58. Monitor 21 can be detached from support member 50 by further loosening bolt member 58. If monitor 21 is detachable, the operator can bring monitor 21 back after terminating the work.

As have been described with reference to FIG. 2, monitor 21 is connected to controller 20 through communication cable 23, and supply of power and data communication with respect to monitor 21 are performed with use of communication cable 23. If a connector enabling connection and disconnection of communication cable 23 is provided to allow detachment of connector at the time of detaching monitor 21, communication cable 23 can be readily connected or detached. Surely, it is preferable to select a connector with high durability so that connection and detachment of the communication cable can be performed repeatedly.

Further, first tilt angle θ1 at which monitor 21 at the interference position tilts relative to vertical direction V may be smaller than second tilt angle θ2 at which monitor 21 at the non-interference position tilts relative to vertical direction V. Accordingly, monitor 21 is tilted with respect to vertical direction V, so that monitor 21 can be moved from the interference position to the non-interference position.

Further, when monitor 21 is at the interference position, upper edge 21a of display screen 21d is arranged more on front side F than lower edge 21b. When monitor 21 is at the non-interference position, lower edge 21b is arranged more on front side F than upper edge 21a. Accordingly, an operator seated on operator's seat 61 can visually recognize display screen 21d in an easy manner.

Further, when monitor 21 is at the non-interference position, display screen 21d may be oriented toward the lateral side of cab 4 more as compared to the case of being at the interference position. Accordingly, monitor 21 can be moved so that display screen 21d is oriented toward the lateral side of cab 4 to move monitor 21 from the interference position to the non-interference position.

Work implement control lever 65 may be arranged to avoid interference with the most rear part of monitor 21 at the neutral position. Accordingly, when monitor 21 is moved to the non-interference position to avoid the interference between front window 47 and monitor 21, interference of monitor 21 with respect to work implement control lever 65 can be avoided.

Second Embodiment

Figure 9:
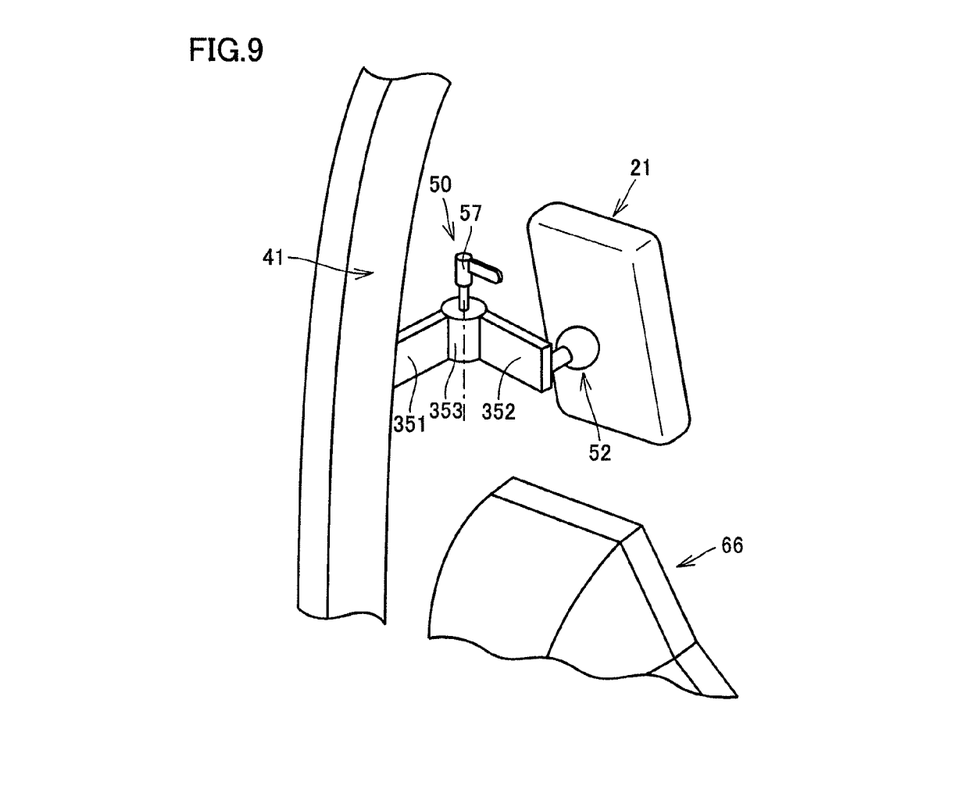
FIG. 9 schematically represents a configuration of a support member of a second embodiment.

Referring to FIG. 9, support member 50 of hydraulic excavator 1 according to the second embodiment has a configuration different from that of support member 50 according to the first embodiment shown in FIGS. 4 and 5 in having a uniaxial hinge.

Support member 50 according to the second embodiment has a first arm portion 351 as a base portion fixed to first pillar 41, a second arm portion 352 different from first arm portion 351, and a hinge 353 coupling first arm portion 351 and second arm portion 352. First arm portion 351 and second arm portion 352 are formed to have a shape of a rectangular plate. First arm portion 351 and second arm portion 352 are coupled so as to be relatively rotatable through hinge 353. Therefore, second arm portion 352 is provided rotatably with respect to first arm portion 351 fixed to be not movable on first pillar 41 with a periphery of one end forming one side of the rectangle as an axis.

At the other end of second arm portion 352 forming other side of the rectangle, a joint member 52 is attached. Monitor 21 has a configuration such as a bracket to which the spherical portion of joint member 52 can be fitted. Monitor 21 is supported by support member 50 so as to be freely movable relative to second arm portion 352 about the spherical portion of joint member 52 as a center.

Support member 50 has a position retaining mechanism limiting relative movement between first arm portion 351 and second arm portion 352. The position retaining mechanism is provided with a tab portion 57. When an operator holds and rotates tab portion 57, second arm portion 352 is switched to be rotatable or not rotatable relative to first arm portion 351.

Also in the present embodiment, monitor 21 is supported by support member 50 so as to be movable to the interference position interfering with the movement region of front window 47 and the non-interference position of avoiding interference with the movement region of front window 47. Specifically, FIG. 9 shows monitor 21 at the interference position. From the state shown in FIG. 9, second arm portion 352 is rotated relative to first arm portion 351 to allow first arm portion 351 and second arm portion 352 are arranged so as to be on the same plane. Further, monitor 21 is rotated about the spherical portion of joint member 52. Accordingly, monitor 21 can be moved to the non-interference position, so that the effect explained in the first embodiment can be obtained similarly.

Second arm portion 352 can be moved substantially only along the horizontal plane by connecting first arm portion 351 and second arm portion 352 by means of hinge 353. Therefore, even in the case where insufficient fixing of second arm portion 352 by the position retaining mechanism occurs disadvantageously, lowering of the position of monitor 21 due to the own weight of monitor 21 can be prevented, so that the position of monitor 21 in vertical direction V can be made more stable.

In the embodiments 1 and 2 described above, the examples are described in which support member 50 has a universal joint which is a joint capable of freely changing angles of two joined members. Support member 50 is not limited to this configuration. For example, biaxial hinge type support member 50 having a hinge in place of joint member 52 shown in FIG. 9 may be provided. Also in this case, appropriately designing the position and shape of the arm portion allows arrangement of both monitor 21 and support member 50 at positions not overlapping with the moving passage of front window 47. In other words, as long as support member 50 is rotatable relative to first pillar 41, and monitor 21 is rotatable relative to support member 50, monitor 21 can be reliably moved from the interference position to the non-interference position by appropriately selecting support member 50.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 hydraulic excavator; 4 cab; 5 work implement; 20 controller; 21, 21A, 21B monitor; 21a upper edge; 21b lower edge; 21d, 66d display screen; 40 front pillar; 41 first pillar; 42 second pillar; 47 front window; 50 support member; 51 base member; 52 joint member; 55, 56 arm members; 57 tab portion; 58 bolt member; 61 operator's seat; 66 monitor device; 141 front wall; 141a opening; B rear side; CL center line; F front side; L left side; R right side; V vertical direction.

The invention claimed is:

1. A hydraulic excavator comprising: a cab and a work implement arranged on one lateral side of said cab,
said cab including:
an operator's seat;
front pillars arranged in front of said operator's seat, and having a first pillar arranged on said one lateral side and a second pillar arranged on another lateral side;
a roof portion covering above said operator's seat;

a first guide rail extending along said first and second pillars;
a second guide rail extending along said roof portion;
a front window having an upper end portion and a lower end portion, said upper end portion being movable along said second guide rail, and said lower end portion being movable along said first guide rail;
a first monitor arranged on a side of said first pillar in front of said operator's seat, and having a first display screen;
a second monitor supported on said first pillar above said first monitor, and having a second display screen larger than said first display screen; and
a support member having a base portion attached to a rear side of said first pillar, a rotating unit supported on said base portion rotatably, and a spherical universal joint supporting said second monitor on said rotating unit,
said support member supporting said second monitor so as to be movable to an interference position interfering with a movement region where said front window moves between a closed state and an opened state of an opening formed between said first and second pillars, and a non-interference position with no interference,
wherein when said second monitor is at said non-interference position, said second monitor aligns with said one lateral side such that said second display screen of said second monitor faces said another lateral side.

2. The hydraulic excavator according to claim 1, wherein said second display screen has an upper edge and a lower edge, and
when said second monitor is at said interference position, said upper edge is arranged more on said front side than said lower edge, and when said second monitor is at said non-interference position, said lower edge is arranged more on the front side than said upper edge.

3. The hydraulic excavator according to claim 1, wherein when said second monitor is at said non-interference position, said second display screen is oriented toward the lateral side of said cab more than the state where said second monitor is at said interference position.

4. The hydraulic excavator according to claim 1, wherein said cab further includes a control lever, and
said control lever at a neutral position is arranged to avoid interference with the most rear part of said second monitor.

5. The hydraulic excavator according to claim 1, further comprising a satellite communication antenna and a communication controller in operative communication with the satellite communication antenna,
wherein the second monitor is configured to display real-time updates of a current position of the hydraulic excavator received from the communication controller.

6. The hydraulic excavator according to claim 1, wherein when said second monitor is at said non-interference position, said second display screen of said second monitor tilts rearward relative to vertical at a tilt angle.

* * * * *